(12) United States Patent
Beguin

(10) Patent No.: US 10,019,591 B1
(45) Date of Patent: *Jul. 10, 2018

(54) LOW-LATENCY MEDIA SHARING

(71) Applicant: Amazon Technologies, Inc., Seattle, WA (US)

(72) Inventor: Julien George Beguin, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/580,267

(22) Filed: Dec. 23, 2014

(51) Int. Cl.
| | |
|---|---|
| *H04L 29/06* | (2006.01) |
| *H04L 29/08* | (2006.01) |
| *H04L 9/08* | (2006.01) |
| *G06F 21/62* | (2013.01) |
| *H04N 1/00* | (2006.01) |
| *H04N 21/418* | (2011.01) |

(52) U.S. Cl.
CPC .......... *G06F 21/6218* (2013.01); *G06F 21/62* (2013.01); *H04L 63/08* (2013.01); *H04L 67/288* (2013.01)

(58) Field of Classification Search
CPC .. G06F 21/62; G06F 21/6218; G06F 21/6236; H04N 7/1675; H04N 1/00127; H04N 1/00283; H04W 12/04; H04L 63/061; H04L 67/1065; H04L 67/288; H04L 9/0816; G09G 2370/16
USPC ................ 713/165, 168, 171; 726/4, 26–27; 380/277; 709/223, 225, 231, 206
See application file for complete search history.

(56) References Cited

U.S. PATENT DOCUMENTS

| 6,073,168 A * | 6/2000 | Mighdoll .................. G06F 8/65 348/E5.105 |
|---|---|---|
| 8,874,915 B1 * | 10/2014 | Rodoper ............... H04L 63/061 380/278 |
| 9,253,166 B2 * | 2/2016 | Gauda ................. G06F 21/6218 |
| 9,674,892 B1 * | 6/2017 | Li ......................... H04W 88/08 |
| 9,769,133 B2 * | 9/2017 | Pogorelik ............ H04L 63/062 |
| 2006/0098649 A1 * | 5/2006 | Shay ..................... H04L 63/102 370/389 |
| 2006/0177066 A1 * | 8/2006 | Han ...................... H04L 63/061 380/277 |
| 2007/0027960 A1 * | 2/2007 | De Leon ........... H04L 29/06027 709/217 |
| 2007/0110012 A1 * | 5/2007 | Abu-Amara .......... G06F 21/105 370/338 |

(Continued)

*Primary Examiner* — Shanto M Abedin
(74) *Attorney, Agent, or Firm* — Pierce Atwood LLP

(57) ABSTRACT

Devices, systems and methods are disclosed that receive encrypted media files from a remote device during pre-caching. The encrypted media files may be transferred from the remote devices prior to a user issuing a request to share the particular media file. The remote device may maintain cryptographic keys associated with the sent encrypted media files and only share a cryptographic key associated with a media file the user wishes to share. Without the cryptographic keys, the local device cannot access the contents of the pre-shared encrypted media files in a cache. Upon the user sharing the media file and the local device receiving the cryptographic key, the local device may use the cryptographic key to decrypt the encrypted media file and display the media file at a significantly reduced latency than if the media file were sent only upon the sharing request.

24 Claims, 14 Drawing Sheets

(56) References Cited

U.S. PATENT DOCUMENTS

| | | | |
|---|---|---|---|
| 2009/0129587 A1* | 5/2009 | Zhou ................... | H04N 7/1675 380/277 |
| 2010/0169502 A1* | 7/2010 | Knowlson ........... | H04L 67/2847 709/231 |
| 2013/0254815 A1* | 9/2013 | Pfeffer ............. | H04N 21/25891 725/96 |
| 2014/0122885 A1* | 5/2014 | Wu ........................ | H04L 29/06 713/171 |
| 2015/0052565 A1* | 2/2015 | Farrell ................. | H04L 65/608 725/74 |
| 2015/0120749 A1* | 4/2015 | Phanishayee ..... | G06F 17/30321 707/741 |
| 2015/0304306 A1* | 10/2015 | Ponsford ............. | G06F 21/6218 713/171 |
| 2016/0094648 A1* | 3/2016 | Han ................... | H04L 67/1051 709/209 |

* cited by examiner

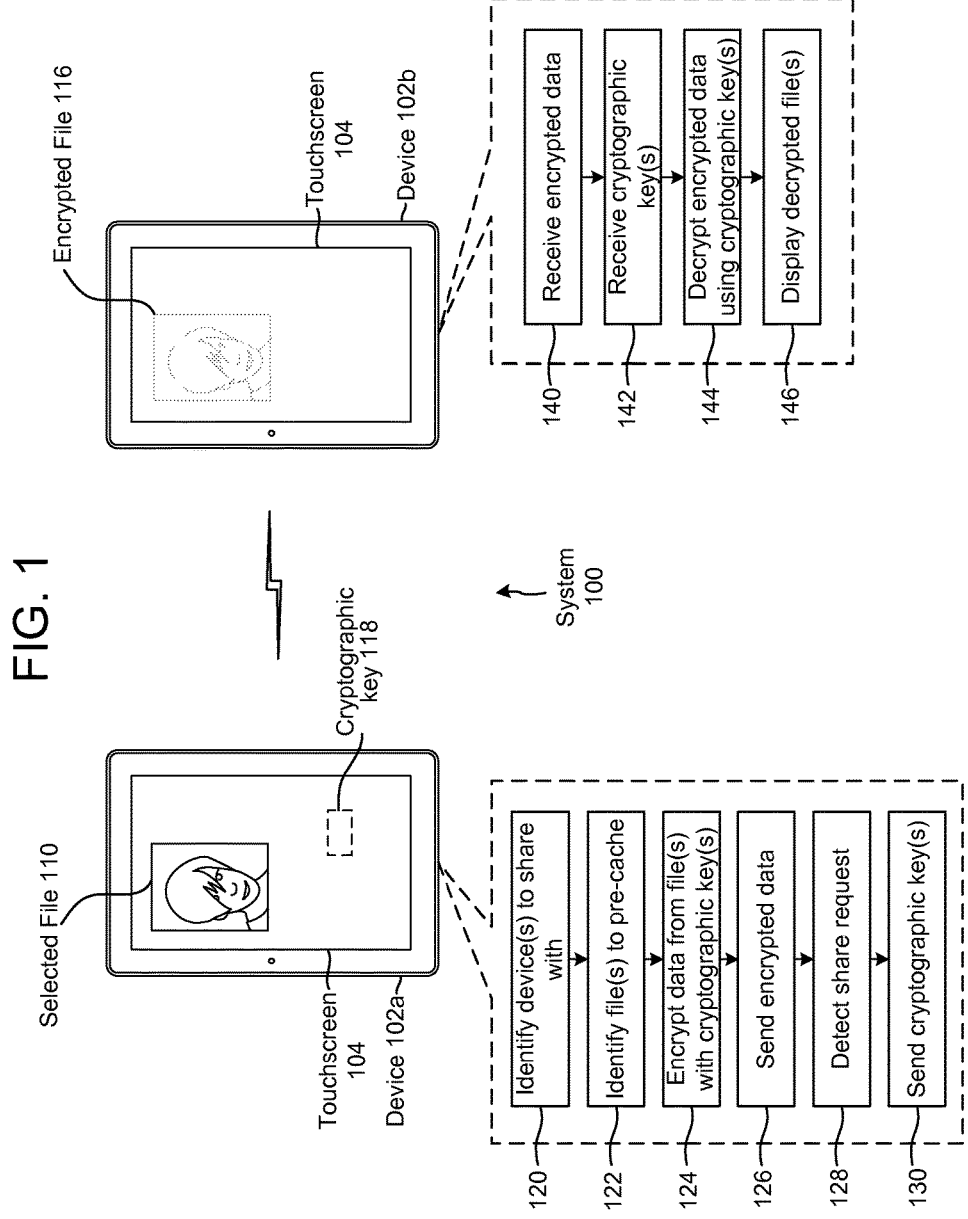

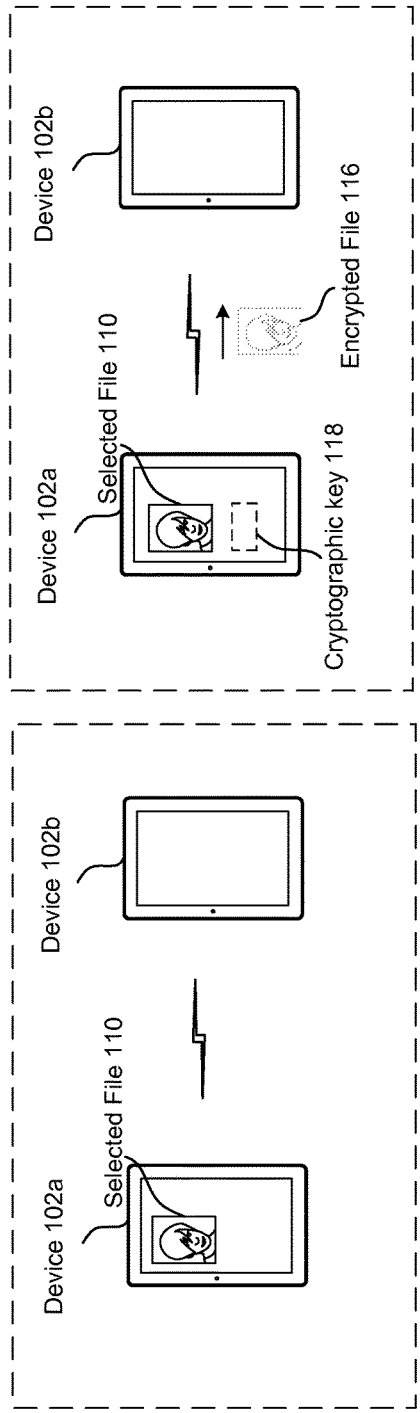
FIG. 2A
FIG. 2B
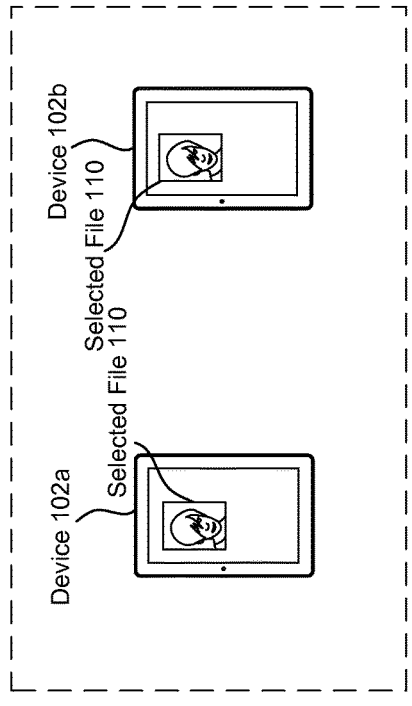
FIG. 2C
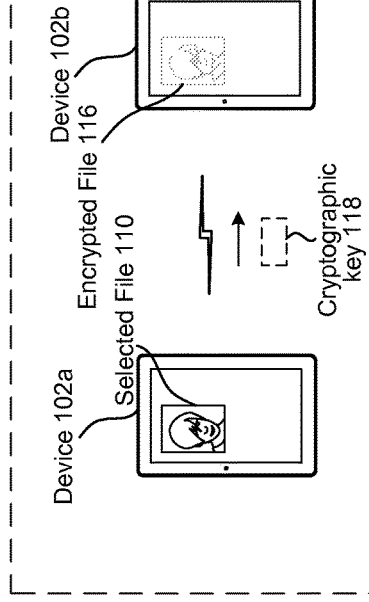
FIG. 2D
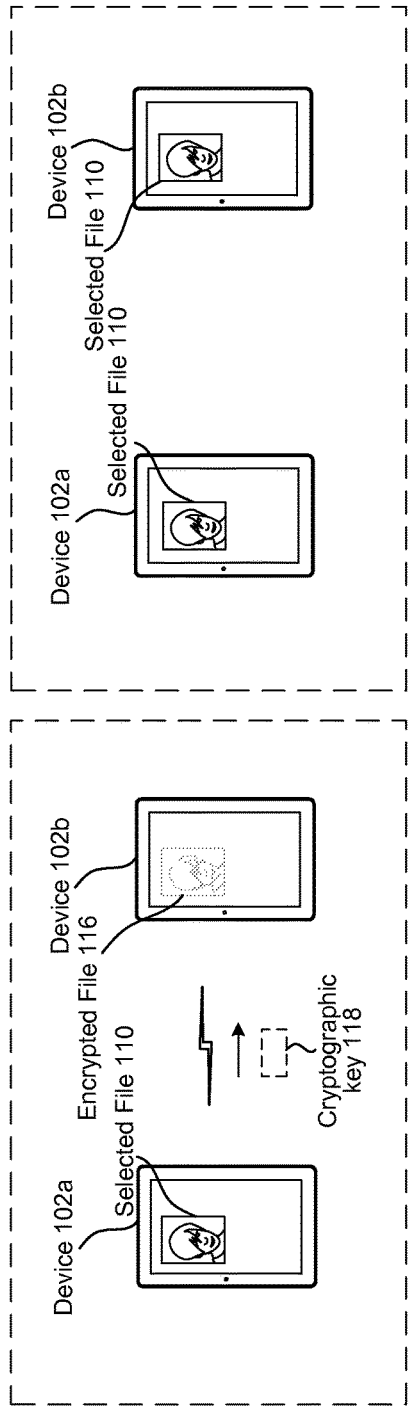

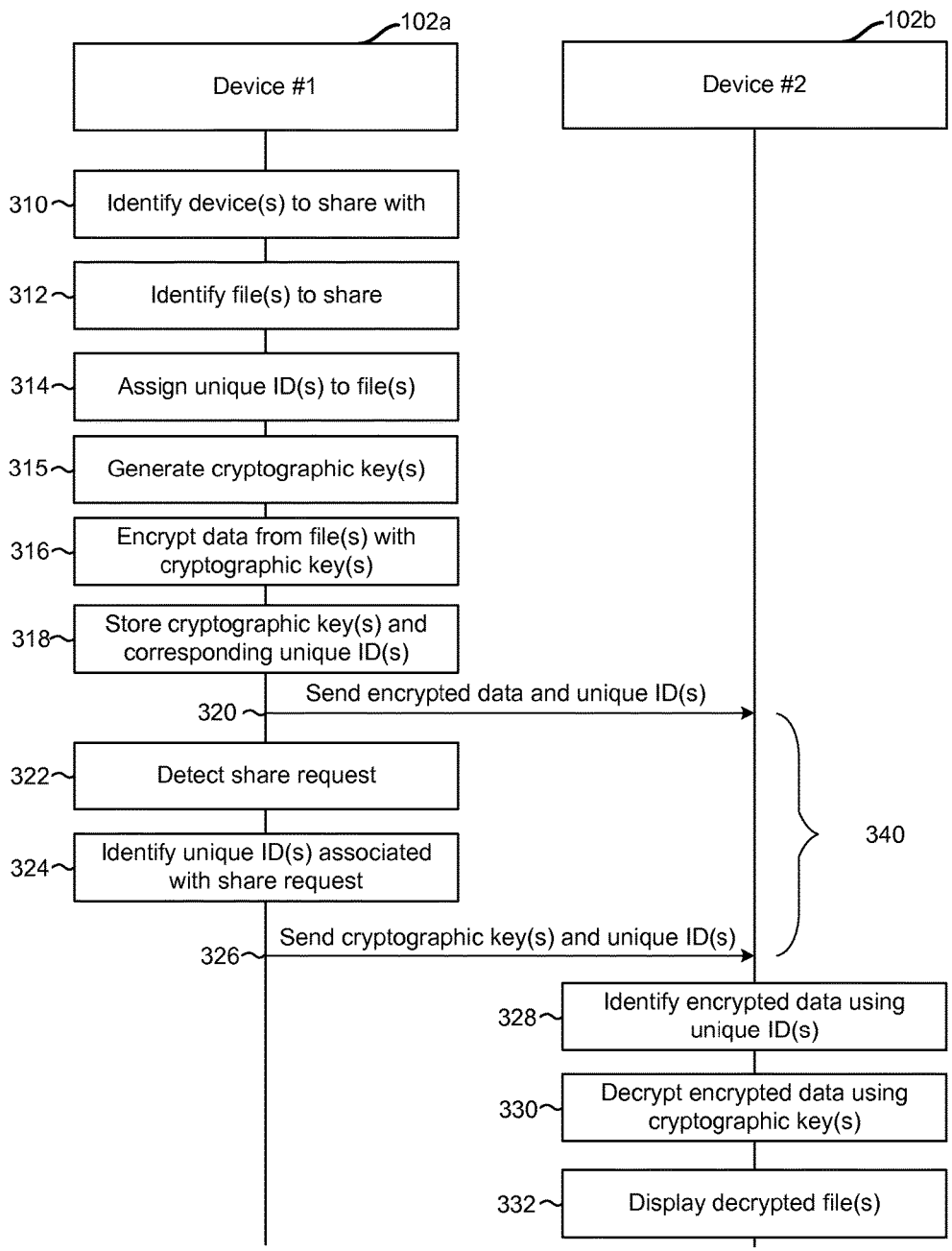

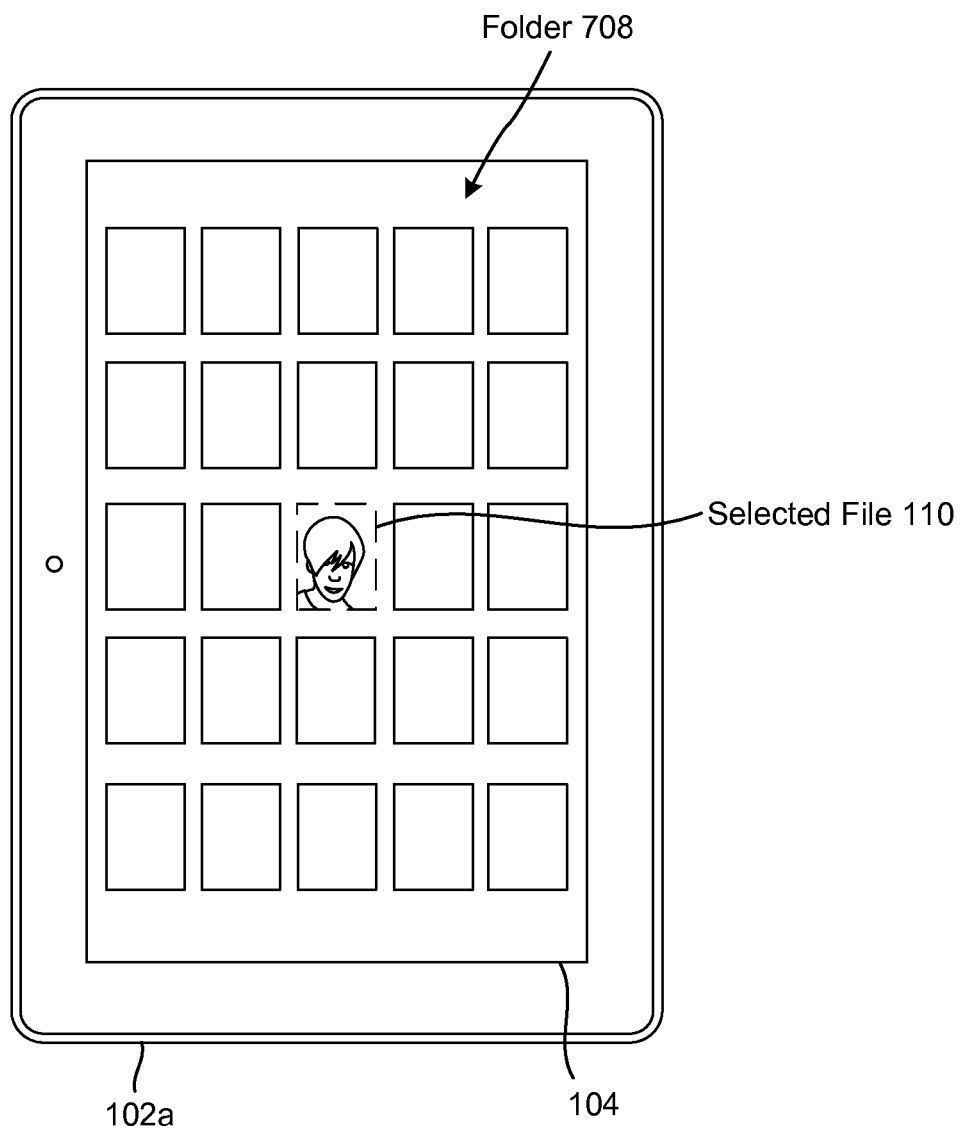

LOW-LATENCY MEDIA SHARING

BACKGROUND

With the advancement of technology, the use and popularity of electronic devices, such as mobile devices, has increased considerably. Mobile devices, such as smart phones and tablet computers, typically have touchscreens that enable a user to operate the devices by touching the screen with a finger or stylus type device.

BRIEF DESCRIPTION OF DRAWINGS

For a more complete understanding of the present disclosure, reference is now made to the following description taken in conjunction with the accompanying drawings.

FIG. 1 illustrates an overview of a system for implementing embodiments of the present disclosure.

FIG. 2A-2D illustrate a simplified example of a first device sharing a selected file with a second device according to embodiments of the present disclosure.

FIG. 3 illustrates a flowchart conceptually illustrating an example method for a first device sharing a selected file with a second device using pre-caching according to embodiments of the present disclosure.

FIGS. 7A-7D illustrate examples of identifying a selected file and/or predicted files according to embodiments of the present disclosure.

DETAILED DESCRIPTION

Figure 4:
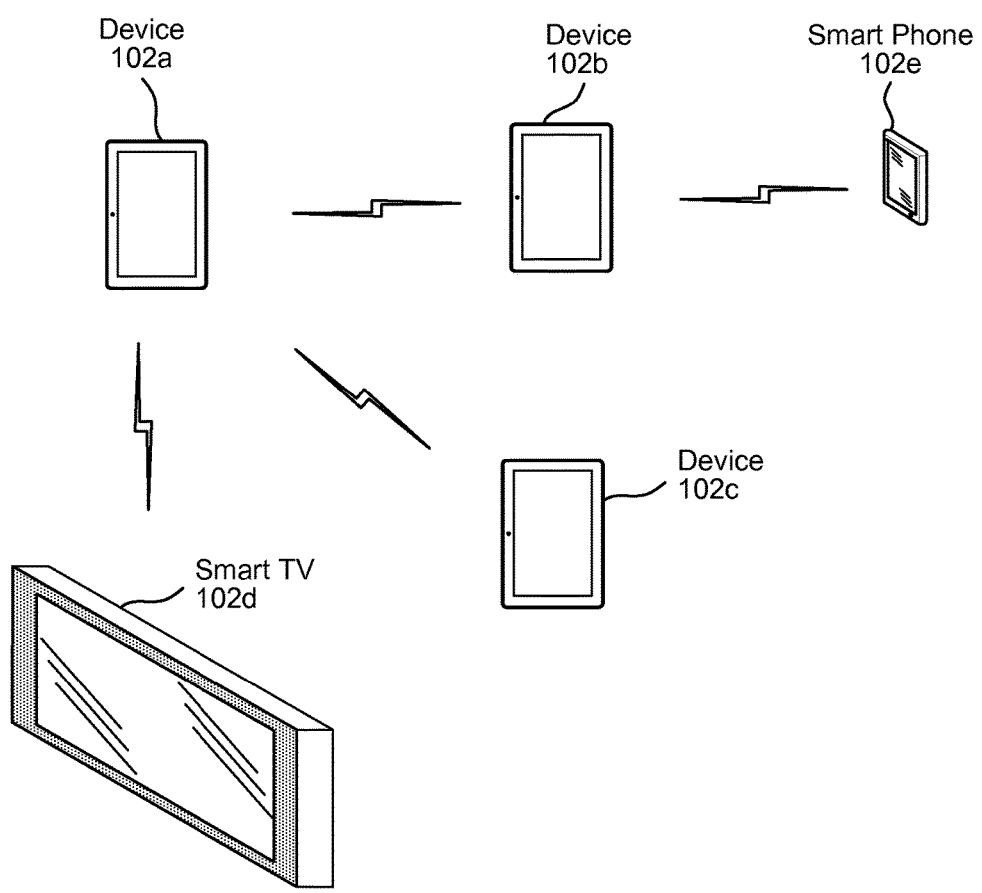
FIG. 4 illustrates an example of a peer to peer networking system using direct communication according to embodiments of the present disclosure.

When a user of a mobile device (e.g., a smart phone or tablet computer) wishes to share a media file (e.g., a picture or a video) with another device (e.g., another phone or tablet, a television or a computer), the experience is enhanced if the sharing can be completed with as little delay as possible. This is particularly true when the sharing occurs in the same physical location or during a conversation. An example would be swiping an image or video from a tablet computer to a TV. The user may expect the image/video to animate smoothly from the tablet computer onto the TV, without pausing for as long as several seconds to transmit the megabytes of data constituting the image/video. A delay between swiping the image/video and the image/video being displayed on the TV may be referred to as latency.

To reduce the latency, the devices may have an extremely high-speed connection to quickly transfer megabytes of data, but this is not always possible or practical. An alternative approach is to anticipate that the user may want to share a media file and transmit the media file before the user actually executes a share request (e.g., a command to share) to share the media file. The media file may be sent to an in-memory cache on the remote device, such that the media file may be displayed quickly once the user executes the share request to share the media file. Such a system is not perfect, however. For example, the user may ultimately decide not to share a particular media file that a system has already sent to the remote device, resulting in a potential breach of privacy as the remote device may retain the media file that the user did not intend to share.

To address these issues, devices, systems and methods are disclosed that combine the latency benefit of pre-caching with enhanced security to prevent potential breaches of privacy. The system may encrypt media files prior to transmission. The encrypted media files may be transmitted during pre-caching such that the encrypted media files are transferred from a user's device to the remote device prior to the user executing a share request to share a media file. The user's device may maintain cryptographic keys associated with encrypted media files where the keys may be used to decrypt and access the encrypted media files that have been transmitted to remote devices during pre-caching. Without the cryptographic keys, the remote device cannot access the contents of the pre-shared encrypted media files in the remote device's cache. The user's device may thus only share a cryptographic key associated with a media file the user actually wishes to share. Upon the user executing a share request to share the media file, the user's device will send the respective cryptographic key to the remote device. The remote device may then receive the cryptographic key and use the cryptographic key to decrypt the encrypted media file. The remote device may then display the unencrypted media file. The time between when a user executes the share request to share the media file and when the remote device is capable of displaying the unencrypted media file may be significantly shorter than the time it would have taken for the user device to transmit the full media file to the remote device without the pre-caching. Thus the sharing experience may appear to be almost immediate, giving the impression that the media file was transmitted nearly instantaneously. Thus, once an encrypted file is pre-cached, in response to the share request to share a media file with the remote device, the user's device may transmit the cryptographic key to the remote device in place of the media file.

FIG. 1 illustrates an overview of a system 100 for implementing embodiments of the disclosure. The system includes a first computing device 102a that may have a display touchscreen 104, and a user may write, draw, or otherwise interact with the touchscreen 104, and through the touchscreen 104, one or more applications and/or processes of the computing device 102. The touchscreen 104 is a display capable of receiving input via contact between an object (such as a finger, stylus, etc.) and the screen. The system also includes a second computing device 102b having a touchscreen 104. As shown in FIG. 1, is the touchscreen 104 is being used by a user to operate the first device 102a to share a selected file 110 with the second device 102b.

To reduce a latency between the first device 102a detecting a share request to share the selected file 110 and the second device 102b receiving and displaying the selected file 110, the first device 102a may anticipate that the user may want to share the selected file 110. The first device 102a may encrypt the selected file 110 into an encrypted file 116 with a cryptographic key 118 and transmit the encrypted file 116 to an in-memory cache on the second device 102b, prior to the first device 102a detecting a share request to share the selected file 110. When the user executes a share request (e.g., a command to share) to share the selected file 110 with the second device 102b, the first device 102a may transmit the cryptographic key 118 to the second device 102b so that the second device 102b may decrypt the encrypted file 116 into the selected file 110 and display the selected file 110 almost immediately, giving the impression that the selected file 110 was transmitted very quickly. Thus, in response to a share request requesting the first device 102a to share the selected file 110 with the second device 102b, the first device 102a may transmit the cryptographic key 118 to the second device 102b in place of the selected file 110.

For ease of explanation, the disclosure refers to "file" or "files." However, as used herein, "file" or "files" may refer to any data and may include media files (e.g., image files, audio files, video files or the like), documents (e.g., text documents, spreadsheet documents, presentation documents or the like), electronic publications (e.g., books, text books, comic books or the like), account profiles (e.g., credit card numbers, account numbers, purchase history, browsing history, social website profiles, dating website profiles or the like) or other data. In addition, a file may have additional data associated with the file that may be stored separately from the file.

The first device 102a may identify (120) device(s) to share with. For example, the first device 102a may identify device(s) in proximity to the first device 102a, within a shared network with the first device 102a, communicable with a shared application with the first device 102a and/or based on current or previous relationships with other devices. Examples of device(s) in proximity to the first device 102a may include device(s) accessible using short-range wireless communication, such as by Bluetooth, infrared, Near-field communication (NFC), wireless Universal Serial Bus (USB), Zigbee, etc. compliant protocols. Examples of a shared network include a wired local area network (LAN), a wireless local area network (WLAN) such as WiFi, a wireless ad hoc network, a near-me area network (NAN), a personal area network (PAN), etc. Examples of device(s) communicable with a shared application may be devices running social networking applications, email applications, etc. Examples of current or previous relationships may include current or previous interactions with a particular device, current or previous interactions with a user associated with the particular device, or current or previous interactions with an account running on the particular device. Device(s) having more current or previous interactions may have a higher priority than devices having fewer current or previous interactions. For example, the first device 102a may determine that there are more interactions between the first device 102a and the second device 102b than interactions between the first device 102a and a third device, and may give priority to the second device 102b over the third device. Therefore, the first device 102a may send encrypted files to the second device 102b prior to sending encrypted files to the third device based on the established relationship. Recipient device priority may also be determined using other factors.

The first device 102a may identify (122) file(s) to pre-cache on the first device 102a. The file(s) to pre-cache may be files on the first device 102a that the first device 102a anticipates or predicts that a user of the first device 102a has a high probability of sharing with the second device 102b. For example, the first device 102a may identify a file, such as the selected file 110, based on the user selecting the file. After identifying the selected file 110, the first device 102a may identify files associated with or near the selected file 110, such as files preceding or subsequent to the selected file 110 in a folder, files including tags associated with the selected file 110, and/or files taken within a determined time period of the selected file 110. Alternatively, the first device 102a may identify the selected file based on the device(s) identified to share with. For example, the second device 102b may be associated with a social networking account and the first device 102a may identify a file associated with the social networking account, such as a file uploaded to the social network. The first device 102a may also identify file(s) to share using various other algorithms to detect files as candidates for sharing. A number of different techniques for identifying files for sharing may be used.

The first device 102a may encrypt (124) data from the identified file(s) to share with cryptographic key(s), such as the cryptographic key 118. For example, the first device 102a may encrypt a first file with a first cryptographic key to generate a first encrypted file and encrypt a second file with a second cryptographic key to generate a second encrypted file. Individual files may be associated with individual cryptographic keys, although the disclosure is not limited thereto. In some embodiments, multiple files may be associated with a single individual cryptographic key, such as multiple files from an individual folder when the individual folder is shared by the first device 102a. After encrypting the data, the first device 102a may send (126) the encrypted data to the second device 102b.

When the user shares file(s), the first device 102a may detect (128) a share request associated with the file(s) and may send (130) cryptographic key(s) associated with the file(s) to the second device 102b. For example, the first device 102a may detect a share request to share the selected filed 110 and may send the cryptographic key 118 associated with the selected file 110 to the second device 102b. An example of a share request may be contact between the user and the first device 102a corresponding to the user dragging an icon associated with the selected file 110 to an icon associated with the second device 102b. The user may use a finger or an accessory device, such as a stylus, a remote control, a keyboard, a mouse or the like.

Initially, the second device 102b may receive (140) encrypted data from the first device 102a. The encrypted data may be associated with file(s) from the first device 102a and may include multiple encrypted files. For example, the second device 102b may receive the encrypted file 116 from the first device 102a, and the encrypted file 116 may be associated with the selected file 110 on the first device 102a. At a later point in time, the second device 102b may receive (142) cryptographic key(s) from the first device 102a, the cryptographic key(s) associated with particular file(s), such as the cryptographic key 118 associated with the selected file 110. The second device 102b may identify encrypted data associated with the cryptographic key(s) and may decrypt (144) the encrypted data using the cryptographic key(s) to generate decrypted file(s). For example, the second device 102b may identify the encrypted file 116 associated with the cryptographic key 118 and may decrypt the encrypted file 116 to generate the selected file 110. The second device 102b may display (146) the decrypted file(s), such as the selected file 110. Thus, as the second device 102b received the encrypted data prior to the user executing a share request to share the file(s), the second device 102b may decrypt the encrypted data and display the decrypted files with in a short time period of the share request.

FIG. 2A-2D illustrate a simplified example of a first device 102a sharing a selected file 110 with a second device 102b according to embodiments of the present disclosure. For example, FIG. 2A illustrates the first device 102a having identified the second device 102b in proximity to the first device 102a and identified a selected file 110 on the first device 102a to share. For example, the user of the first device 102a may have opened the selected file 110 in an image viewing application or selected the selected file 110 in an application on the first device 102a. At this point, the first device 102a has not transmitted any data associated with the selected file 110 to the second device 102b.

FIG. 2B illustrates the first device 102a having encrypted the selected file 110 with a cryptographic key 118 to generate encrypted file 116 and transmitting the encrypted file 116 to the second device 102b. As shown in FIG. 2B, the first device 102a includes the selected file 110 and the cryptographic key 118, while the second device 102b is receiving the encrypted file 116.

FIG. 2C illustrates the first device 102a having received a share request (e.g., a command to share) associated with the selected file 110 from a user and transmitting the cryptographic key 118 to the second device 102b. At this point, the second device 102b cannot access the encrypted file 116 as the second device 102b has not received the cryptographic key 118.

FIG. 2D illustrates the second device 102b having received the cryptographic key 118 and used the cryptographic key 118 to decrypt the encrypted file 116 to generate the selected file 110. At this point, the selected file 110 has been successfully decrypted on the second device 102b and the second device 102b may display the selected file 110.

FIG. 3 illustrates a flowchart conceptually illustrating an example method for a first device 102a sharing a selected file from a first device 102a with a second device 102b using pre-caching according to embodiments of the present disclosure.

The first device 102a may identify (310) device(s) to share with. For example, the first device 102a may identify device(s) in proximity to the first device 102a, within a shared network with the first device 102a, within a shared application with the first device 102a and/or based on previous relationships with other devices, as described above.

The first device 102a may identify (312) file(s) to share on the first device 102a. For example, the first device 102a may identify a file, such as the selected file 110, based on the user selecting the file. After identifying the selected file 110, the first device 102a may identify files associated with or near the selected file 110, such as files preceding or subsequent to the selected file 110 in a folder, files including tags associated with the selected file 110, and/or files taken within a determined time period of the selected file 110. Alternatively, the first device 102a may identify a file based on the device(s) identified to share with. For example, the second device 102b may be associated with a social networking account and the first device 102a may identify a file associated with the social networking account, such as a file uploaded from the first device 102a to the social network.

The first device 102a may assign (314) unique identifier(s) (ID(s)) to the file(s). For example, the first device 102a may assign a first ID to a first file and a second ID to a second file. The unique ID(s) may be a string of numbers and/or characters, or other identification, used to differentiate the file(s). The unique ID(s) may be used by the first device 102a and the second device 102b to identify the file(s) and other data associated with the file(s) when selecting files for sharing, identifying files to associate with a cryptographic key, etc.

The first device 102a may generate (315) cryptographic key(s) with which to encrypt data. The cryptographic key(s) may be generated using symmetric key algorithms, such as the Data Encryption Standard (DES) or the Advanced Encryption Standard (AES), although the disclosure is not limited thereto. Instead, the cryptographic key(s) may be generated using asymmetric key algorithms (e.g., public-key cryptography), such as RSA, or using any other methods known to one of skill in the art. For example, the cryptographic key(s) may be generated using random number generators, 128 bit numbers as a random key, pseudorandom key generators or the like. The cryptographic key(s) may be single use keys, meaning each key is used to encrypt a single encrypted file. Alternatively, each cryptographic key may be used to encrypt multiple encrypted files from a single file. For example, the first device 102a may identify an image as a first file and may encrypt a low resolution version, a medium resolution version and a high resolution version of the first file using a single cryptographic key.

The first device 102a may encrypt (316) data from the identified file(s) with cryptographic key(s) and may associate the encrypted file(s) with corresponding unique ID(s). For example, the first device 102a may encrypt the first file with a first cryptographic key to generate a first encrypted file and encrypt the second file with a second cryptographic key to generate a second encrypted file. The first encrypted file may be associated with the first ID and the second encrypted file may be associated with the second ID. For example, the first encrypted file may include a header containing the first ID and the second encrypted file may include a header containing the second ID. In addition, the headers may include timestamps associated with a creation of the first encrypted file and the second encrypted file. Individual files may be associated with individual cryptographic keys, although the disclosure is not limited thereto. For example, some embodiments may associate multiple files with an individual cryptographic key, such as multiple files from an individual folder when the individual folder is shared by the first device 102a or multiple version of an individual file, such as a low resolution version and a high resolution version of an image file.

The first device 102a may store (318) cryptographic key(s) and corresponding unique ID(s) on the first device 102a. For example, the device 102a may manage cryptographic key(s) to store the cryptographic key(s) and associate the cryptographic key(s) with corresponding unique ID(s). The cryptographic key(s) may be associated with a specific time, for example using a timestamp, and the first device 102a may ignore and/or remove cryptographic key(s) a determined period (e.g., expiration time threshold) after the cryptographic key(s) were created based on the timestamp. As an example, the first device 102a may use a lookup table to associate the cryptographic key(s) and corresponding unique ID(s). Alternatively, the first device 102a may ignore and/or remove cryptographic key(s) when the first device 102a and/or the second device 102b disconnect from the network, when the first device 102a determines that the user is unlikely to share the identified file(s) corresponding to the cryptographic key(s), or the like.

The first device 102a may send (320) the encrypted data and corresponding unique ID(s) to the second device 102b. The encrypted data may be associated with file(s) from the first device 102a using the unique ID(s) and may include multiple encrypted files. For example, the first device 102a may send the first encrypted file and the second encrypted file to the second device 102b along with the first ID and the second ID. As discussed above, the first ID may be included in a header of the first encrypted file and the second ID may be included in a header of the second encrypted file.

The encrypted data may be associated with a specific time, for example using a timestamp, and the second device 102b may ignore and/or remove encrypted data a determined period after the encrypted data was created and/or received based on the timestamp. Alternatively, the second device 102b may remove encrypted data upon the first device 102a and/or the second device 102b disconnecting from the network and/or each other. In addition, the first device 102a may determine that the user is unlikely to share first file(s) corresponding to first encrypted data. For example, the first device 102a may delete cryptographic key(s) and/or determine that there is a low probability of the first file(s) being shared. After identifying the first encrypted data corresponding to the deleted cryptographic key(s) or the first file(s), the first device 102a may send a signal to the second device 102b to remove the first encrypted data. The second device 102b may store the encrypted data in a circular buffer and may overwrite previous encrypted data with new encrypted data as the circular buffer repeats. In some examples, the first device 102a and/or the second device 102b may prioritize the encrypted data and the second device 102b may remove encrypted data based on the priority of the encrypted data. For example, the first device 102a may determine a priority of encrypted data based on a probability of corresponding files being shared with the second device 102b, and the second device 102b may protect high priority encrypted data from being overwritten in the circular buffer or other storage locations.

When the user shares file(s), the first device 102a may detect (322) a share request associated with the file(s) and may identify (324) unique ID(s) associated with the share request. For example, the first device 102a may detect a share request to share the first file but not the second file and may identify the first ID associated with the first file being shared. The share request may include a swiping motion selecting the first file and swiping the first file towards the second device 102b. The swiping motion may be detected by the device 102 as contact originating at a location on the display 104 associated with the first file and continuing across the display 104 in a line, such that the first device 102a may determine a vector originating at the location associated with the first file. For example, the first device 102a may detect a select command from a user, the select command selecting the first file on the first device 102a, and may determine the first file as a file to be shared in response to the select command. The first device 102a may then detect a swiping motion selecting the first file and swiping in a first direction relative to the first device 102a. The first device 102a may identify one or more devices located in the first direction relative to the first device 102a and select the second device 102b from the one or more devices as a device with which to share the first file.

As described above, the share request may include a command received by the first device 102a from a user interface (UI) component, such as a user of the first device 102a commanding the first device 102a to share a file with the second device 102b. Alternatively, the share request may include a command received by the second device 102b from a UI component, such as a user of the second device 102b issuing a command to a first device 102a (e.g., a server, the cloud or the like) to share a file with the second device 102b. In some examples, the share request may include a command received by the first device 102a and/or the second device 102b from a third device. For example, a user of the third device may use the third device to instruct the first device 102a (e.g., a server, the cloud or the like) to share a file with the second device 102b (e.g., television or the like).

The first device 102a may send (326) cryptographic key(s) and unique ID(s) associated with the file(s) included in the share request to the second device 102b. The first device 102a may identify the cryptographic key(s) based on the unique ID(s) identified in step 324. For example, the first device 102a may identify the first cryptographic key using the first ID and may send the first cryptographic key and the first ID to the second device 102b. A length of time (340) between the first device 102a sending the encrypted data in step 320 and the first device 102a sending the cryptographic key(s) and unique ID(s) in step 326 corresponds to an amount of time potentially saved by the pre-caching process as the first device 102a may use the length of time 340 to transfer encrypted files to the second device 102b prior to the share request.

After receiving the cryptographic key(s) and unique ID(s), the second device 102b may identify (328) encrypted data using the unique ID(s). For example, a header of the encrypted data may include the unique ID and the second device 102b may identify the encrypted data using the unique ID(s). Thus, the second device 102b may receive the first cryptographic key and the first ID, may identify the first encrypted file using the first key and may associate the first encrypted file with the first cryptographic key.

The second device 102b may decrypt (330) encrypted data using the cryptographic key(s) and may display (332) the decrypted file(s) on the second device 102b. For example, the second device 102b may decrypt the first encrypted file using the first cryptographic key to generate the first file and may display the first file on the second device 102b.

FIG. 4 illustrates an example of a peer to peer networking system using direct communication according to embodiments of the present disclosure. As illustrated in FIG. 4, a first device 102a may communicate directly with a second device 102b, a third device 102c and/or smart TV 102d. An example of this peer to peer networking system may be the first device 102a in close proximity to the second device 102b, the third device 102c and the smart TV 102d, such as the devices 102 being located within a conference room. In a first example, a first user of the first device 102a may share a file with the second device 102b by swiping the file towards the second device 102b. The first device 102a may have location clues to identify relative locations of the other devices 102 with respect to the first device 102a. The second device 102b may be a portable device, as illustrated in FIG. 4, but the second device 102b may instead be a television or projector within the conference room, such as the smart TV 102d. In a second example, the first user may share a file with both the second device 102b and the third device 102c by selecting the file in a shared application and executing a share request (e.g., a command to share) in the shared application to share the file. The shared application may be any application shared amongst the devices 102, such as a networking or messaging application running on the first device 102a, the second device 102b and/or the third device 102c.

To reduce a latency involved in sharing the file, the first device 102a may identify the second device 102b, the third device 102c and/or the smart TV 102d as devices with which to share files. To illustrate this, the first device 102a and the second device 102b may have had previous interactions, whereas the first device 102a and the third device 102c may have had no prior interactions. In a first example, the first device 102a may identify only the second device 102b as a device with which to share files based on the previous interactions with the second device 102b and a lack of interactions with the third device 102c. In a second example, the first device 102a may identify both the second device 102b and the third device 102c as devices with which to share files based on the proximity between the devices 102.

While FIG. 4 illustrates direct communication between the first device 102a and the second device 102b, the third device 102c and/or the smart TV 102d, the disclosure is not limited thereto. Instead, some example embodiments may include more complicated networking system, such as an ad hoc network where the first device 102a connects to a smart phone 102e via the second device 102b. An example of an ad hoc network may be a number of devices 102 in a conference room connected to only a portion of devices within range. While each of the devices 102 may potentially connect to any of the other devices 102 in the room directly, the ad hoc network may improve performance by simplifying a number of connections between the devices 102.

Figure 5:
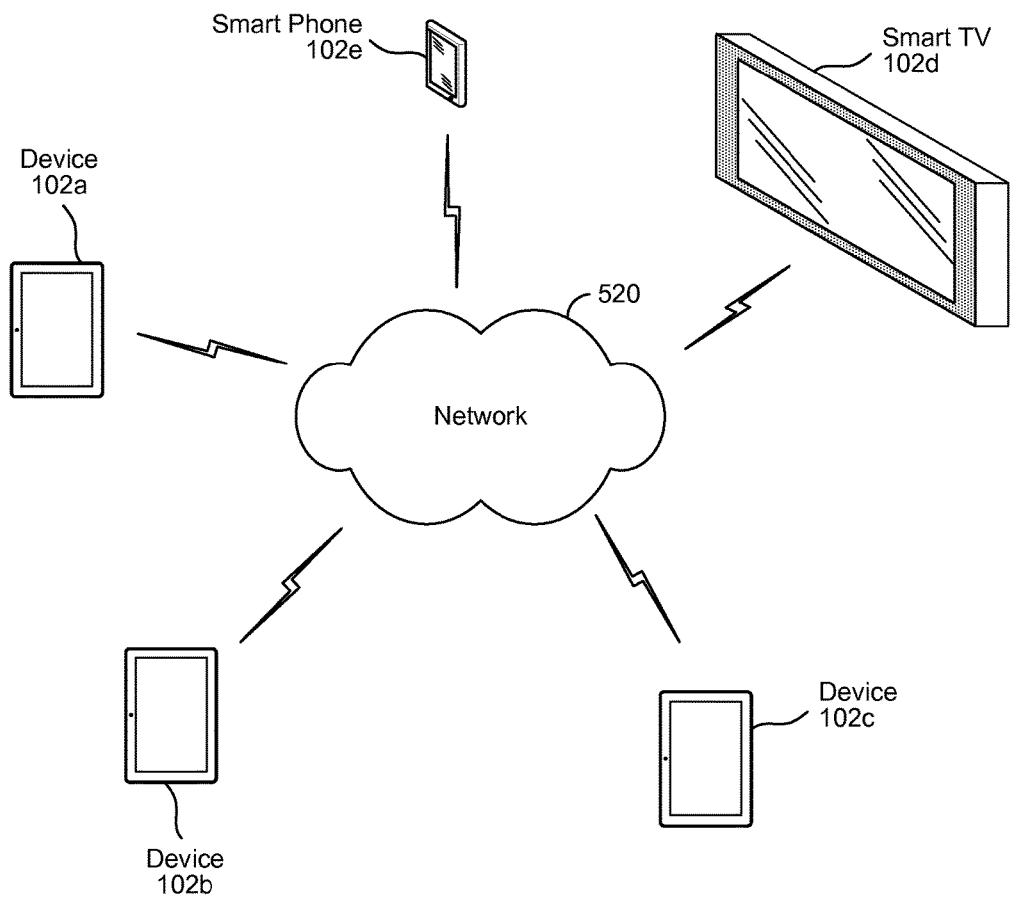
FIG. 5 illustrates an example of a wireless networking system according to embodiments of the present disclosure.

FIG. 5 illustrates an example of a wireless networking system according to embodiments of the present disclosure. As illustrated in FIG. 5, a first device 102a may communicate with a second device 102b, third device 102c, smart TV 102d and/or smart phone 102e via a network 520. An example of this wireless networking system may be a wireless router connecting multiple devices 102 within range of the wireless router. The network 520 may be a local or private network and may only connect the first device 102a with other devices 102 within the local or private network. In a first example, a first user of the first device 102a may share a file with the second device 102b by swiping the file towards the second device 102b. The first device 102a may have location clues to identify relative locations of the other devices 102 with respect to the first device 102a. The second device 102b may be a portable device, as illustrated in FIG. 5, but the second device 102b may instead be a television or projector used to present, such as the smart TV 102d. In a second example, the first user may share a file with both the second device 102b and the third device 102c by selecting the file in a shared application and executing a share request (e.g., a command to share) in the shared application to share the file. The shared application may be any application shared amongst the devices 102, such as a networking or messaging application running on the first device 102a, the second device 102b, the third device, the smart TV 102d and/or the smart phone 102e.

To reduce a latency involved in sharing the file, the first device 102a may identify the second device 102b, the third device 102c, the smart TV 102d and/or the smart phone 102e as devices with which to share files. This identification may be based on user preferences. To illustrate this, the first device 102a and the second device 102b may have had previous interactions, whereas the first device 102a may have had no prior interactions with the third device 102c, the smart TV 102d and/or the smart phone 102e. In a first example, the first device 102a may identify only the second device 102b as a device with which to share files based on the previous interactions with the second device 102b and a lack of interactions with the other devices. In a second example, the first device 102a may identify all of the devices connected via the network 520 as devices with which to share files based on the shared network.

Figure 6:
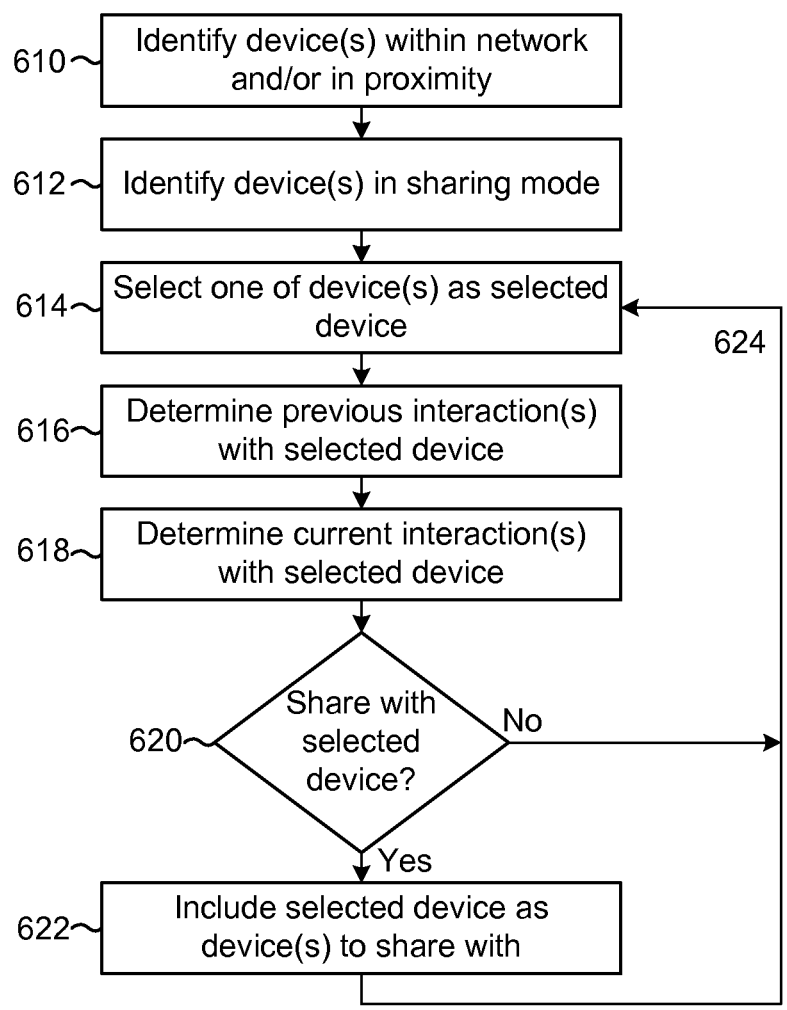
FIG. 6 illustrates a flowchart conceptually illustrating an example method for identifying devices with which to share files according to embodiments of the present disclosure.

FIG. 6 illustrates a flowchart conceptually illustrating an example method for identifying devices with which to share files according to embodiments of the present disclosure. The first device 102a may identify (610) device(s) within network and/or in proximity and identify (612) device(s) in sharing mode. For example, the first device 102a may identify the second device 102b and the third device 102c as in proximity to the first device 102a and may determine that both the second device 102b and the third device 102c are in a sharing mode. Alternatively, the first device 102a may identify the second device 102b, the third device 102c, the fourth device 102d and the smart phone 102e within the network 520, as illustrated in FIG. 5, and may identify that only the second device 102b and the third device 102c are in sharing mode. In some examples, device(s) may be in sharing mode if the device(s) are accessible by the first device 102a. In other examples, device(s) may be in sharing mode if the device(s) are in a particular setting, such as with a particular application running on the device(s).

The first device 102a may select (614) one of the device(s) as a selected device. The first device 102a may determine (616) previous interaction(s) with the selected device and determine (618) current interaction(s) with the selected device. The first device 102a may determine an account associated with the selected device, so examples of previous interaction(s) may include previous communication between the first device 102a and the selected device, previous communication between the first device 102a and a user associated with the selected device, or previous communication between the first device 102a and the account associated with the selected device, such as via social networking applications, email applications, etc. Examples of current interaction(s) may include current communication between the first device 102a and the selected device, the user associated with the second device and/or the account associated with the selected device. For example, current interaction(s) may occur when the first device 102a is running a first application enabling text based communication and the selected device is running the first application and in communication with the first device 102a.

Based on the previous interaction(s) and the current interaction(s) with the selected device, the first device 102a may determine (620) whether to share with the selected device. If the first device 102a determines to share with the selected device, the first device 102a may include (622) the selected device as device(s) to share with. If the first device 102a does not determine to share with the selected device in step 620, or after step 622, the first device 102a may loop (624) to step 614 and repeat steps for additional devices identified within the network and/or in proximity to the first device 102a.

Figure 7A:
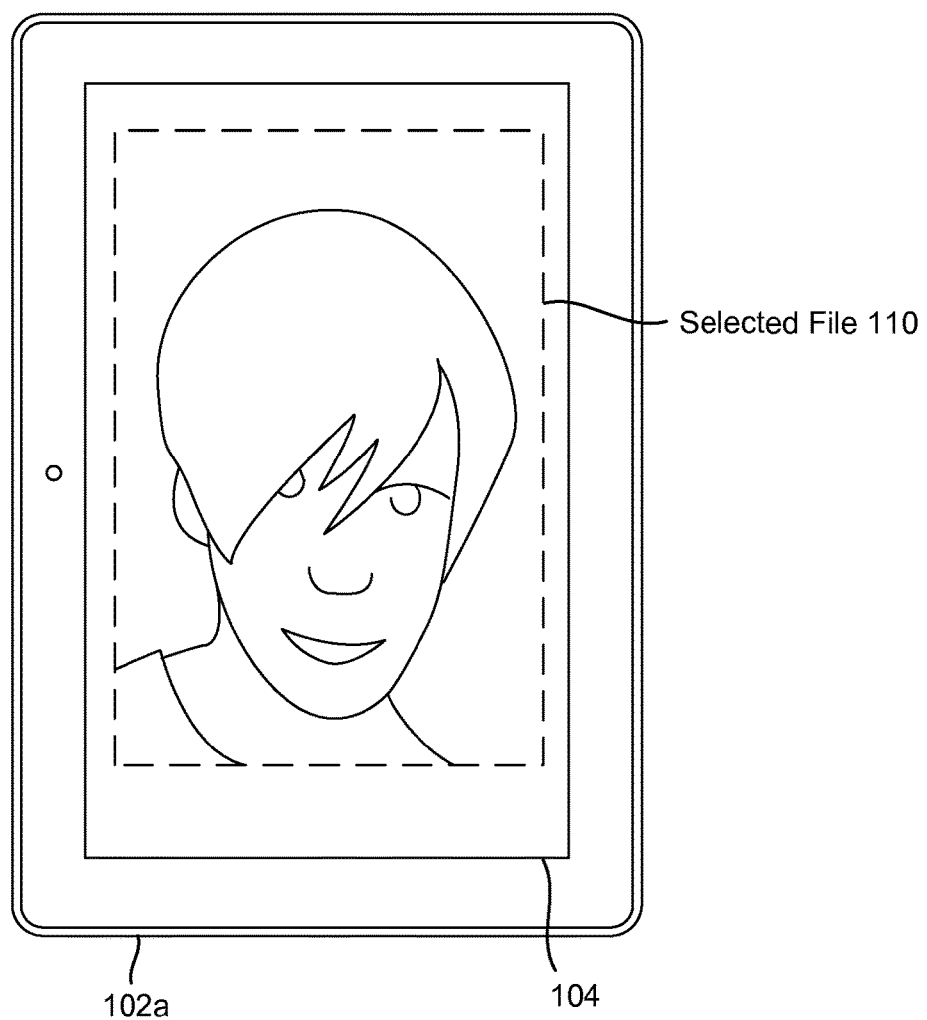

FIGS. 7A-7D illustrate examples of identifying a selected file and/or predicted files according to embodiments of the present disclosure. As illustrated in FIG. 7A, a user of a first device 102a may view a file on a display 104 of the first device 102a. As a result, the first device 102a may identify the file as a selected file 110 and may share the selected file 110 with remote device(s). For example, the user of the first device 102a may open a first file briefly and scroll to a second file, viewing the second file for a period of time. Based on the period of time, the first device 102a may identify the second file as a selected file and share the selected file using the method described in greater detail above with regard to FIG. 3. Alternatively, the first device 102a may identify the first file as a first selected file and the second file as a second selected file due to the user opening the first file and the second file.

FIG. 7B illustrates a folder 708 including a plurality of files. If the user is viewing the selected file 110, the first device 102*a* may identify the file as a selected file 110 and may share the selected file 110 with remote device(s). Further, if the user selects a file, such as by clicking on the file within the folder 708, the first device 102*a* may identify the file as a selected file 110 despite the file not being viewed full screen on the display 104 as shown in FIG. 7A.

Figure 7C:
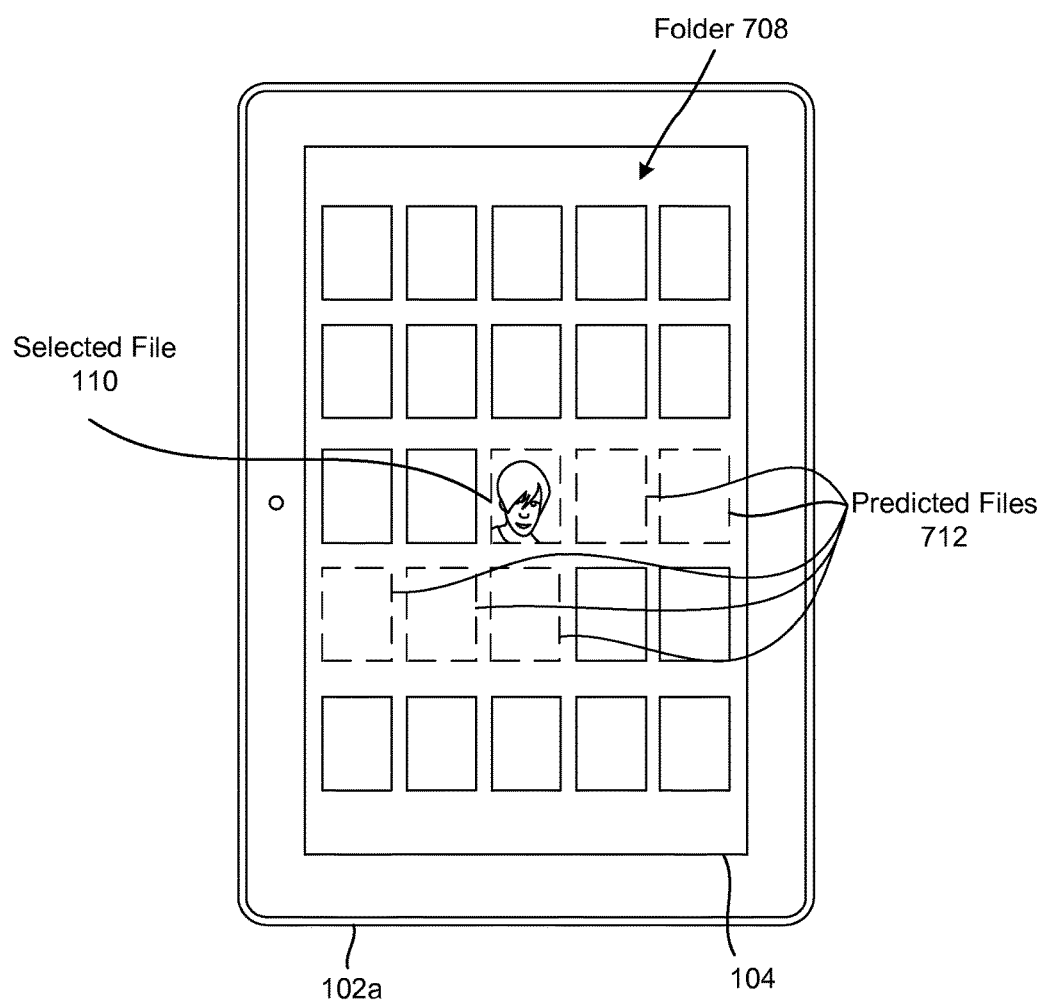
Figure 7D:
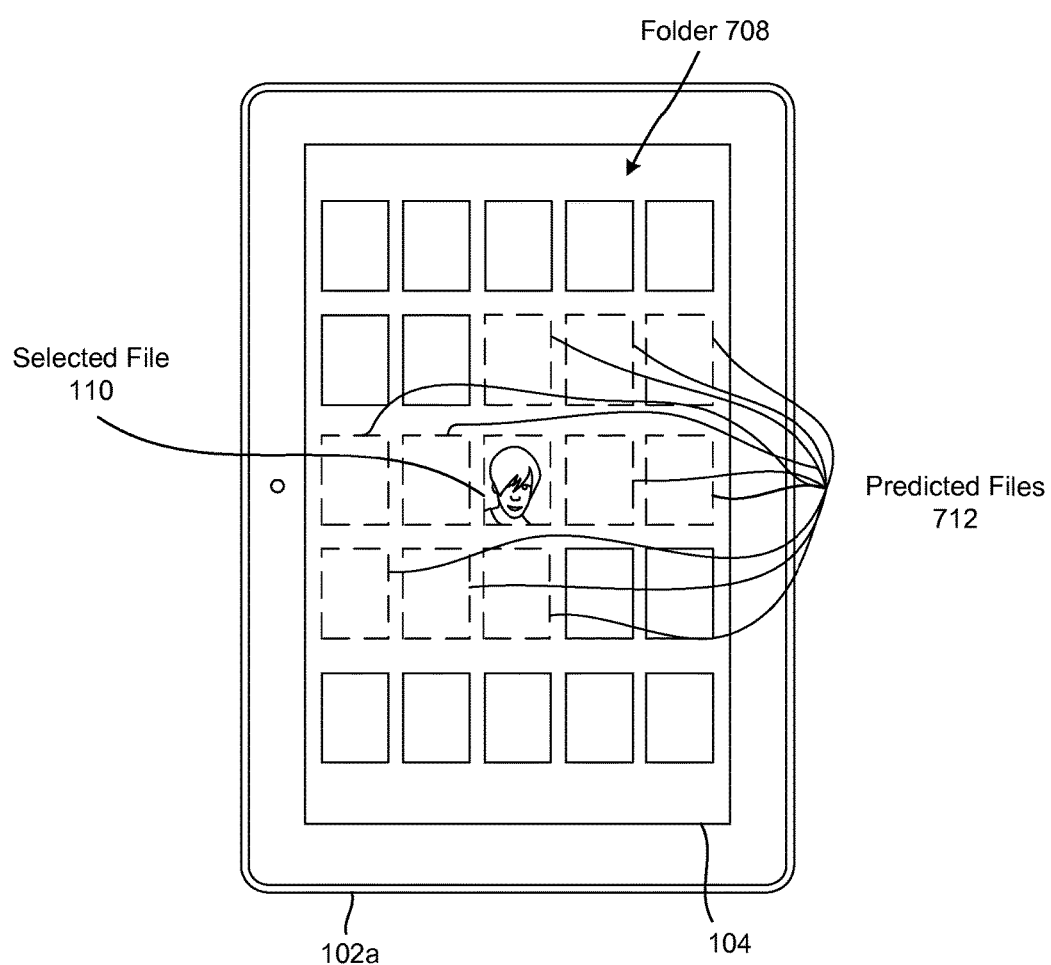

FIGS. 7C-7D illustrate the first device 102*a* identifying the selected file 110 as discussed above and identifying predicted files that may be associated with the selected file 110. In FIG. 7C the predicted files 712 are subsequent to the selected file 110, whereas in FIG. 7D the predicted files 712 are prior to and subsequent to the selected file 110. The predicted files may be a predetermined number (e.g., five) of subsequent and/or prior files, although the disclosure is not limited thereto. As an alternative, the first device 102*a* may identify files within a determined date range (e.g., one day) of the selected file as predicted files, or files within a determined folder (e.g., vacation album of pictures). As another example, the first device 102*a* may identify files with a shared tag as the selected file 110, such as files including a detected face from the selected file 110.

Figure 8:
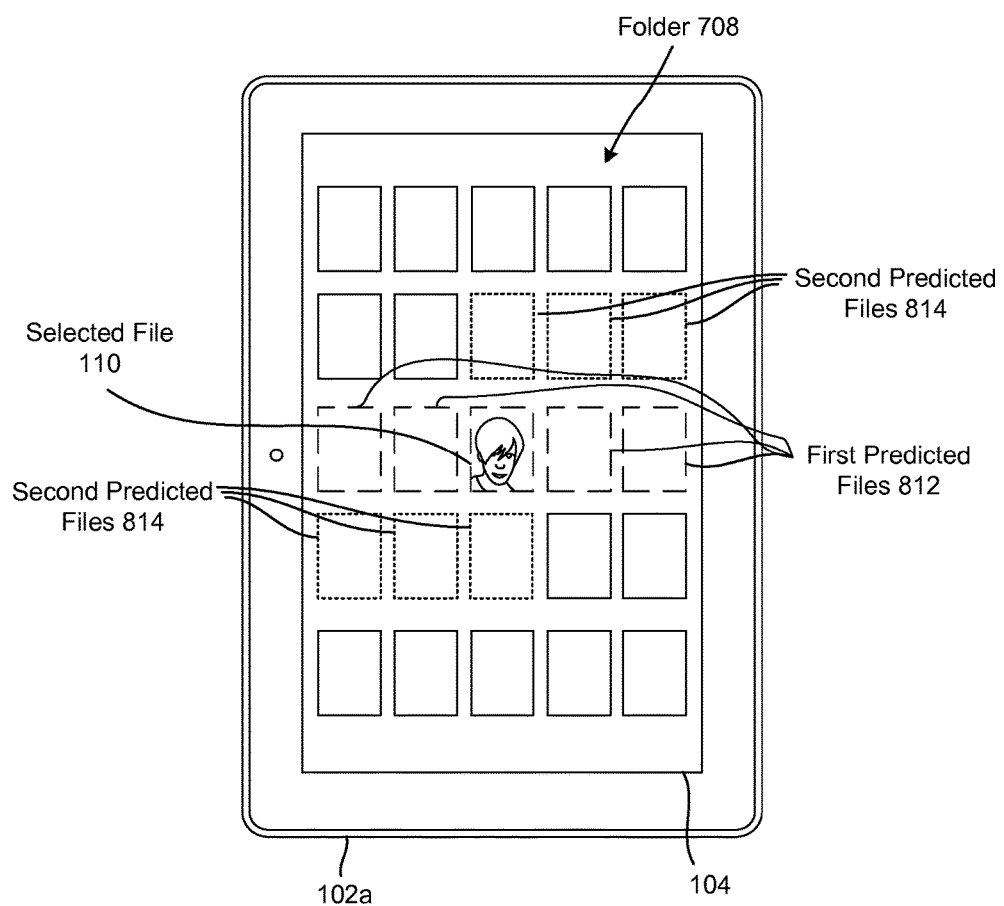
FIG. 8 illustrates an example of identifying a selected file, predicted files and/or compressed predicted files according to embodiments of the present disclosure.

FIG. 8 illustrates an example of identifying a selected file, predicted files and/or compressed predicted files according to embodiments of the present disclosure. As discussed above with regard to FIGS. 7C-7D, the first device 102*a* may identify the selected file 110 and predicted files associated with the selected file 110, such as first predicted files 712. In addition, the first device 102*a* may identify another group of predicted files associated with the selected file 110, labeled as second predicted files 814. For example, as illustrated in FIG. 8, the first device 102*a* may identify a determined number of first predicted files 812 prior to and subsequent to the selected file 110 (e.g., two first predicted files 812 prior to the selected file 110 and two first predicted files 812 subsequent to the selected file 110, for a total of four first predicted files 812) and may identify a determined number of second predicted files 814 (e.g., three second predicted files 814 prior to the first predicted files 812 and three second predicted files 814 subsequent to the first predicted files 812, for a total of six second predicted files 814).

The second predicted files 814 may be compressed or reduced in resolution during the encryption process to reduce a size of the second predicted files 814 relative to the first predicted files 812. Thus, the first device 102*a* may transmit additional encrypted files with less bandwidth requirements and the second device 102*b* may display at least a compressed and/or lower resolution file in response to the first device 102*a* sharing a particular file. For example, if the first device 102*a* shares one of the second predicted files 814, the second device 102*b* may receive a cryptographic key associated with the second predicted file 814, decrypt and display the second predicted file 814 while the first device 102*a* transmits a full resolution version associated with the second predicted file 814 to the second device 102*b*.

Second predicted files may include files formatted to a lower resolution (low-res), files compressed using a lossy or lossless compression algorithm or truncated files including only a portion of an original file. For example, a large file may be truncated so that a corresponding encrypted file includes only a portion of the large file, enabling the second device 102*b* to display the portion of the large file or reducing an amount of time required to download the entirety of the large file by the second device 102*b*. Alternatively, the first device 102*a* may split the large file into sections and encrypt and transmit each of the sections separately. For example, an audio or video file may be transmitted as a series of encrypted files, each encrypted file corresponding to a short section of the audio file or video file.

A single cryptographic key may be used to encrypt multiple encrypted files from a single file. For example, each of the sections of the large file may be encrypted using a single cryptographic key and the second device 102*b* may decrypt the series of encrypted files with the single cryptographic key. As another example, the first device 102*a* may identify an image as a first file and may encrypt a low resolution version, a medium resolution version and a high resolution version of the first file using a single cryptographic key. The first device 102*a* may transmit the encrypted low resolution version to the second device 102*b* at a first time, then transmit the encrypted medium resolution version and/or the encrypted high resolution version to the second device 102*b* at a second time. The second device 102*b* may decrypt each of the encrypted low resolution version, the encrypted medium resolution version and the encrypted high resolution version of the first file using the single cryptographic key. Similarly, a compressed version and a normal version of a second file may be encrypted and decrypted using a second cryptographic key.

While FIG. 8 illustrates an equal number of first predicted files 812 and second predicted files 814 prior to and subsequent to the selected file 110, the disclosure is not limited thereto. Instead, the first device 102*a* may identify a first determined number of first predicted files 812 and/or second predicted files 814 (e.g., three files) prior to the selected file 110 and a second determined number of first predicted files 812 and/or second predicted files 814 (e.g., five files) subsequent to the selected file 110 without departing from the disclosure. In addition, as discussed above, the first device 102*a* may determine the first predicted files 812 and the second predicted files 814 based on a determined date range (e.g., one day) of the selected file 110, within a determined folder (e.g., vacation album of pictures) including the selected file 110, or a tag in common with the selected file 110, such as files including a face detected from the selected file 110. The first determined number, the second determined number, the date range, the determined folder and/or a number of tags in common may be determined based on user preferences. For example, an aggressive user preference may include more files during the pre-caching process to reduce a latency involved with sharing files while consuming more bandwidth and increasing a size of the cache in the second device. In contrast, a conservative user preference may include fewer files during the pre-caching process to reduce a bandwidth and decrease a size of the cache in the second device, despite increasing the latency involved with sharing files.

Figure 9:
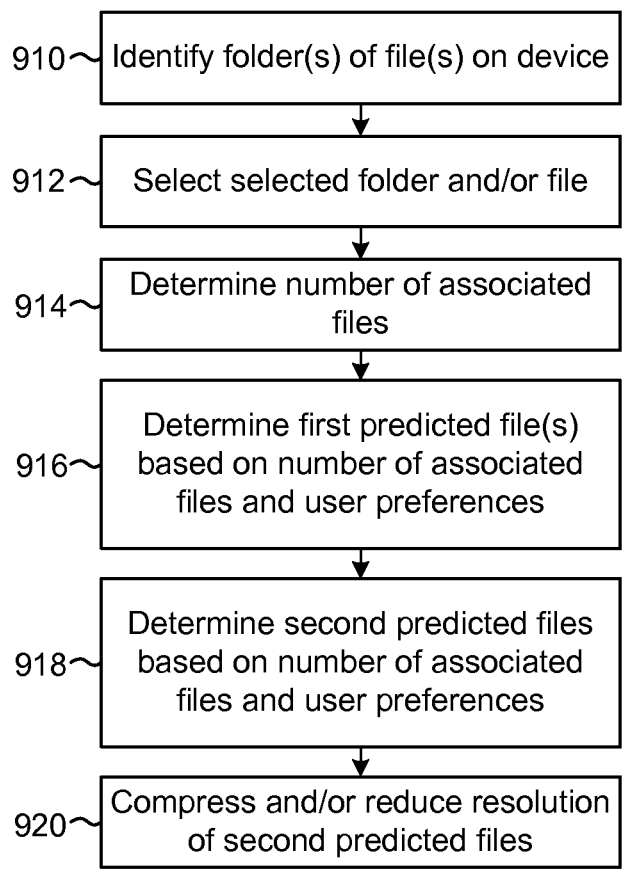
FIG. 9 illustrates a flowchart conceptually illustrating an example method for predicting files to be shared according to embodiments of the present disclosure.

FIG. 9 illustrates a flowchart conceptually illustrating an example method for predicting files to be shared according to embodiments of the present disclosure. The device 102 may identify (910) folder(s) of file(s) on the device 102 and may select (912) a selected folder and/or file. The device 102 may determine (914) a number of associated files based on the selected folder and/or file. The device 102 may determine (916) first predicted file(s) based on a number of associated files and related user preferences. The device 102 may determine (918) second predicted files based on a number of associated files and related user preferences. The device 102 may then compress (920) and/or reduce resolution of the second predicted files. Thus, as described above, the device 102 may determine a number of first predicted file(s) and a number of second predicted files based on user preferences, selecting fewer first predicted file(s) and/or second predicted files based on conservative user preferences and selecting more first predicted file(s) and/or second predicted files based on aggressive user preferences.

Figure 10:
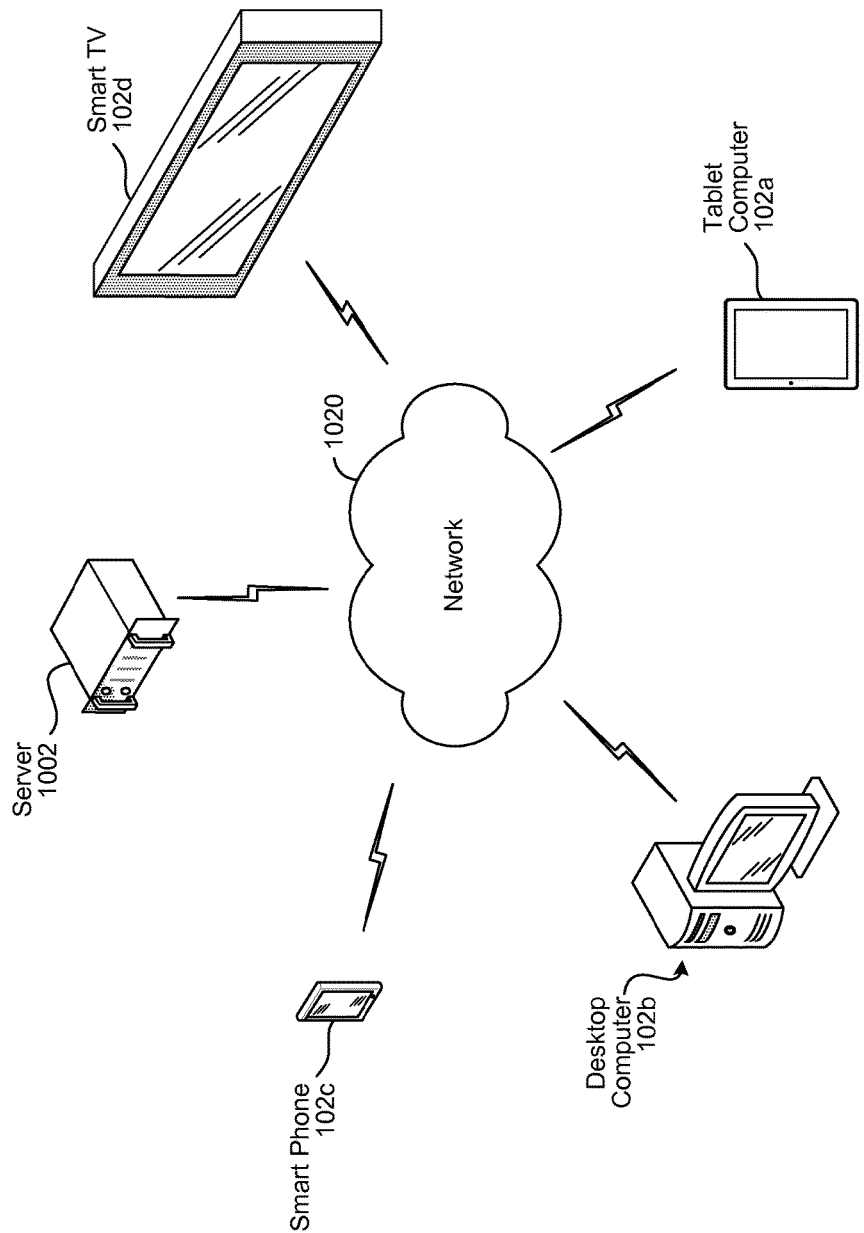
FIG. 10 is a block diagram conceptually illustrating an example of a computer network for use with the present system.

As shown in FIG. 10, multiple devices may be connected over a network 1020. The network 1020 may include a local or private network or may include a wide network such as the internet. Devices may be connected to the network 1020 through either wired or wireless connections. For example, a smart phone 102c may be connected to the network 1020 through a wireless service provider. Other devices, such as desktop computer 102b and/or server 1002, may connect to the network 1020 through a wired connection. In some embodiments the tablet computer 102a may pre-share files via the network 1020, such as during audio/video conferencing. For example, a first user of the tablet computer 102a may be in an audio conference with a second user of the desktop computer 102b and a third user of the smart phone 102c. The first user may address an email to the second user and the third user and attach a first file and a second file. While the first user is completing the email, the tablet computer 102a may pre-share the first file and the second file with the desktop computer 102b and the smart phone 102c. Thus, before the first user finishes the email, an encrypted first file and an encrypted second file may be transmitted from the tablet computer 102a to the desktop computer 102b and the smart phone 102c. Therefore, when the first user finishes and sends the email, the tablet computer 102a may transmit a first cryptographic key and a second cryptographic key and the desktop computer 102b and the smartphone 102c may access and display the first file and the second file with minimal latency. While this example is described with regard to an email application, the disclosure is not limited thereto and the pre-sharing may be accomplished using any application or messaging software.

Figure 11:
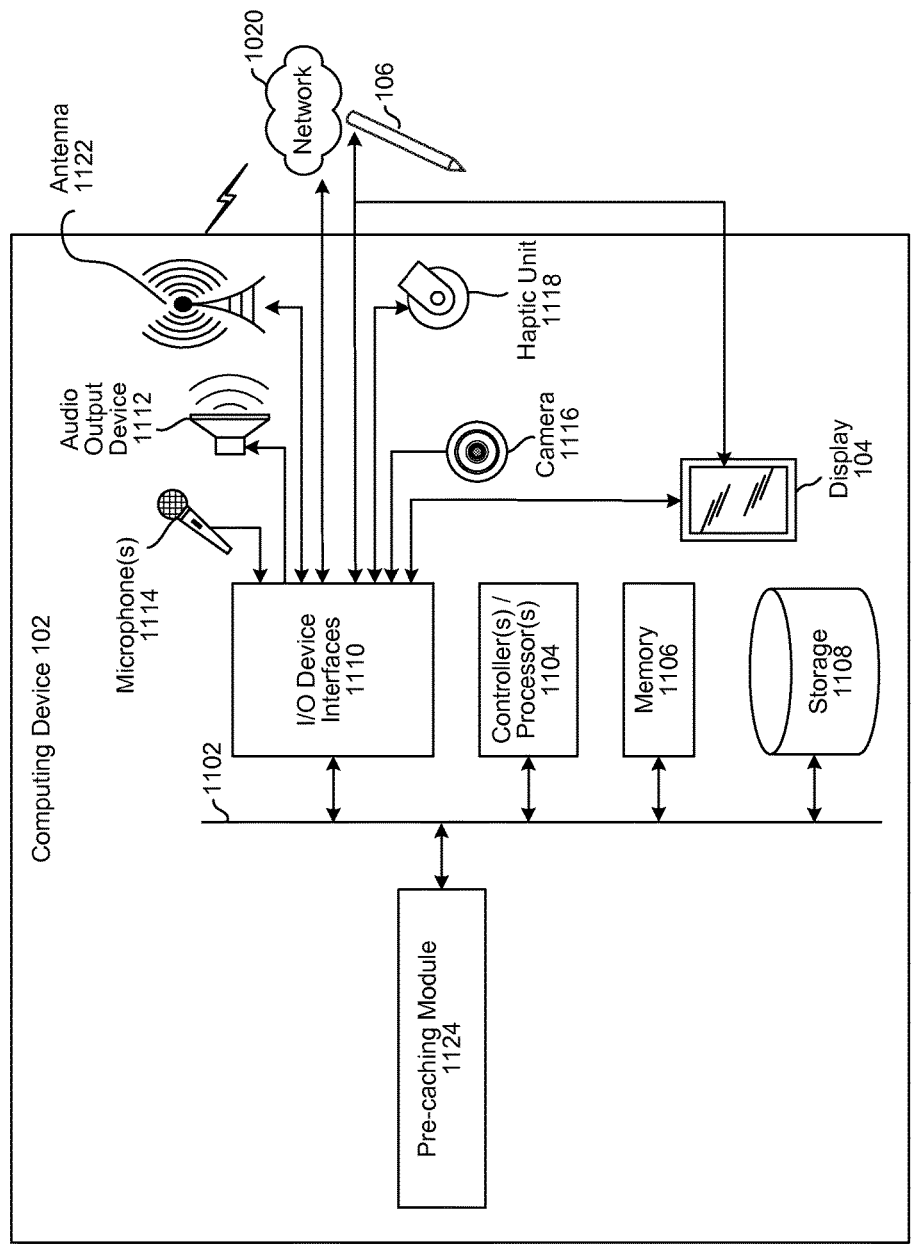
FIG. 11 is a block diagram conceptually illustrating example components of a computing device according to embodiments of the present disclosure.

FIG. 11 is a block diagram conceptually illustrating example components of the computing device 102. In operation, the computing device 102 may include computer-readable and computer-executable instructions that reside on the computing device 102, as is discussed further below.

As illustrated in FIG. 11, the computing device 102 may include an address/data bus 1102 for conveying data among components of the computing device 102. Each component within the computing device 102 may also be directly connected to other components in addition to (or instead of) being connected to other components across the bus 1102.

The computing device 102 may include one or more microcontrollers/controllers/processors 1104 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 102 may also include a data storage component 1108, for storing data and microcontrollers/controller/processor-executable instructions (e.g., instructions to perform one or more steps of the methods illustrated in and described with reference to FIG. 1, 6 or 8). The data storage component 1108 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1110.

Computer instructions for operating the computing device 102 and its various components may be executed by the microcontroller(s)/controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 102 includes input/output device interfaces 1110. A variety of components may be connected through the input/output device interfaces 1110, such as the display or display screen 104 having a touch surface or touchscreen; an audio output device for producing sound, such as speaker(s) 1112; one or more audio capture device(s), such as a microphone or an array of microphones 1114; one or more image and/or video capture devices, such as camera(s) 1116; one or more haptic units 1118; and other components. The display 104, speaker(s) 1112, microphone(s) 1114, camera(s) 1116, haptic unit(s) 1118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 1110 may also include an interface for an external peripheral device connection such as universal serial bus (USB), FireWire, Thunderbolt, Ethernet port or other connection protocol that may connect to networks 1020. The input/output device interfaces 1110 may also include a connection to antenna 1122 to connect one or more networks 1220 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus may connect to the computing device 102 via one of these connections. The touchscreen of the display 104 and the stylus may also communicate data or operating information to one another to enable the computing device 102 to determine a position of the stylus relative to the touchscreen. The stylus may also communicate to the device 102 (either through the display 104) or otherwise, information about the stylus such as a stylus identifier, user identifier, or other information. Additionally, in some embodiments, the computing device 102 (for example, the touchscreen) and the stylus may communicate using electromagnetic communications (for example, electric fields generated by each device to transmit data on a carrier frequency), and/or haptic communications.

The computing device 102 further includes a pre-caching module 1124. Using the various communication components of the device 102, the pre-caching module 1124 may control pre-caching as discussed above, specifically with regard to FIGS. 3, 6 and 9. Some or all of the controllers/modules of the pre-caching module 1124 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, kiosks, gaming consoles, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, by a first device at a first time, a first encrypted image from a second device, the second device within communicable range of the first device, the first encrypted image associated with a first identifier, wherein there is relationship data associated with at least one of the first device and the second device, the relationship data representing at least one previous interaction involving the first device and the second device;
    receiving, by the first device, a second encrypted image from the second device, the second encrypted image associated with a second identifier;
    storing, by the first device, the first encrypted image in a cache;
    storing, by the first device, the second encrypted image in the cache;
    receiving, by the first device at a second time, a first cryptographic key from the second device, wherein the second time is after the first time and the first cryptographic key is associated with the first identifier;
    identifying, based on the first identifier, the first encrypted image in the cache, wherein the first encrypted data is associated with the first cryptographic key;
    generating a first image by decrypting the first encrypted image using the first cryptographic key; and
    displaying the first image.

2. The computer-implemented method of claim 1, further comprising:
    identifying, by the second device at a third time before the first time, the first image on the second device as a candidate for sharing, the first image selected on the second device;
    assigning, by the second device, the first identifier to the first image;
    encrypting, by the second device, the first image to generate the first encrypted image, the encrypting using the first cryptographic key, the first cryptographic key stored on the second device, the first cryptographic key exclusively used to encrypt the first image and decrypt the first encrypted image;
    inserting, by the second device, the first identifier in a header associated with the first encrypted image, the header being supplemental data placed at a beginning of the first encrypted image;
    sending, by the second device at a fourth time after the third time and before the first time, the first encrypted image from the second device to the first device;
    receiving, by the second device at a fifth time after the fourth time and before the second time, a share request instructing the second device to share the first image with the first device;
    identifying, by the second device, the first identifier associated with the first image;
    identifying, by the second device, the first cryptographic key using the first identifier;
    sending, by the second device, the first cryptographic key from the table computer to the first device; and
    sending, by the second device, the first identifier from the table computer to the first device.

3. The computer-implemented method of claim 1, further comprising:
    receiving, by the first device at a third time before the second time, a third encrypted image from the second device, the third encrypted image comprising a compressed version of the first encrypted image;
    identifying the third encrypted image as associated with the first cryptographic key;
    decrypting the third encrypted image using the first cryptographic key; and
    displaying a third image in response to decrypting the third encrypted image.

4. The computer-implemented method of claim 1, further comprising:
    determining, by the first device, that the second encrypted image is past an expiration time threshold, the expiration time threshold being a determined time period after a timestamp, the timestamp stored in a header of the second encrypted image; and
    deleting the second encrypted image from the cache.

5. A computer-implemented method, the method comprising:
    receiving, by a first device at a first time, first encrypted data from a second device, the second device in physical proximity to the first device, the first encrypted data associated with a first identifier, wherein there is relationship data associated with at least one of the first device and the second device, the relationship data representing at least one previous interaction involving the first device and the second device;

receiving, by the first device, second encrypted data from the second device, the second encrypted data associated with a second identifier;

storing, by the first device, the first encrypted data in a cache;

storing, by the first device, the second encrypted data in the cache;

receiving, at a second time, a first cryptographic key from the second device, wherein the second time is after the first time and the first cryptographic key is associated with the first identifier;

identifying, based on the first identifier, the first encrypted data in the cache, wherein the first encrypted data is associated with the first cryptographic key;

generating first data by decrypting the first encrypted data using the first cryptographic key; and displaying the first data.

6. The computer-implemented method of claim 5, further comprising:

identifying, by the second device at a third time, the first data on the second device as a candidate for sharing, the third time before the first time;

generating, by the second device, the first encrypted data based at least in part on the first data;

sending, by the second device at a fourth time, the first encrypted data to the first device, wherein the fourth time is after the third time and before the first time;

after sending the first encrypted data to the first device, receiving, by the second device, a share request instructing the second device to share the first data with the first device; and sending, by the second device, the first cryptographic key to the first device.

7. The computer-implemented method of claim 5, further comprising:

receiving, by the first device at a third time, third encrypted data from the second device, the third time before the second time, the third encrypted data associated with the first encrypted data;

identifying the third encrypted data as associated with the first cryptographic key;

decrypting the third encrypted data using the first cryptographic key; and displaying, by the first device, third data in response to decrypting the third encrypted data.

8. The computer-implemented method of claim 5, further comprising:

determining, by the first device, that the second encrypted data is past an expiration time threshold, the expiration time threshold being a determined time period after a timestamp, the timestamp stored in a header of the second encrypted data; and removing the second encrypted data from the cache.

9. The computer-implemented method of claim 5, further comprising:

receiving a delete signal including the second identifier;

locating the second identifier in a first header in the cache;

determining that the second encrypted data is associated with the first header; and removing the second encrypted data from the cache.

10. The computer-implemented method of claim 5, further comprising:

determining, by the first device, that the second device has disconnected from the first device;

determining that the second encrypted data is associated with the second device; and removing the second encrypted data from the cache.

11. The computer-implemented method of claim 5, further comprising:

sending, by the first device, a share request to the second device instructing the second device to share the first data with the first device.

12. The computer-implemented method of claim 5, further comprising:

sending, by a third device, a share request to the second device instructing the second device to share the first data with the first device.

13. The computer-implemented method of claim 5, wherein the identifying further comprises:

receiving the first from the second device;

locating the first identifier in a first header in the cache; and determining that the first encrypted data is associated with the first header.

14. The computer-implemented method of claim 5, wherein, prior to the first time, there is an established relationship between the first device and the second device, the established relationship including current and previous interactions between the first device and the second device.

15. The computer-implemented method of claim 5, wherein the first cryptographic key is exclusively used to encrypt the first data and decrypt the first encrypted data.

16. The computer-implemented method of claim 5, wherein the at least one previous interaction corresponds to at least one of:

a previous communication between the first device and the second device, a previous communication between the first device and a user profile associated with the second device, or a previous communication between the first device and an account associated with the second device.

17. A computing system, comprising:

a first device, the first device including, at least one processor;

a memory device including instructions operable to be executed by the at least one processor to cause the first device to:

receive, at a first time, first encrypted data from a second device, the second device in physical proximity to the first device, the first encrypted data associated with a first identifier, wherein there is relationship data associated with at least one of the first device and the second device, the relationship data representing at least one previous interaction involving the first device and the second device;

receive second encrypted data from the second device, the second encrypted data associated with a second identifier;

store the first encrypted data in a cache;

store the second encrypted data in the cache;

receive, at a second time, a first cryptographic key from the second device, wherein the second time is after the first time and the first cryptographic key is associated with the first identifier;

identify, based on the first identifier, the first encrypted data in the cache, wherein the first encrypted data is associated with the first cryptographic key;

generate first data by decrypting the first encrypted data using the first cryptographic key; and display the first data.

18. The system of claim 17, further comprising:

a second device, the second device including, at least one processor;

a memory device including instructions operable to be executed by the at least one processor to cause the second device to:
  identify, at a third time, the first data on the second device as a candidate for sharing, the third time before the first time;
  generate the first encrypted data based at least in part on the first data;
  send, at a fourth time, the first encrypted data to the first device, wherein the fourth time is after the third time and before the first time;
  after sending the first encrypted data to the first device, receive a share request instructing the second device to share the first data with the first device; and
  send the first cryptographic key to the first device.

19. The system of claim 17, wherein the instructions further configure the first device to:
  receive, at a third time, third encrypted data from the second device, the third time before the second time, the third encrypted data associated with the first encrypted data;
  identify the third encrypted data as associated with the first cryptographic key;
  decrypt the third encrypted data using the first cryptographic key; and
  display third data in response to decrypting the third encrypted data.

20. The system of claim 17, wherein the instructions further configure the first device to:
  determine that the second encrypted data is past an expiration time threshold, the expiration time threshold being a determined time period after a timestamp, the timestamp stored in a header of the second encrypted data; and
  remove the second encrypted data from the cache.

21. The system of claim 17, wherein the instructions further configure the first device to:
  receive a delete signal including the second identifier;
  locate the second identifier in a first header in the cache;
  determine that the second encrypted data is associated with the first header; and
  remove the second encrypted data from the cache.

22. The system of claim 17, wherein the instructions further configure the first device to:
  determine that the second device has disconnected from the first device;
  determine that the second encrypted data is associated with the second device; and
  remove the second encrypted data from the cache.

23. The system of claim 17, wherein the instructions further configure the first device to:
  send a share request to the second device instructing the second device to share the first data with the first device.

24. The system of claim 17, further comprising:

a third device, the third device including, at least one processor;

a memory device including instructions operable to be executed by the at least one processor to cause the third device to:
  send a share request to the second device instructing the second device to share the first data with the first device.

* * * * *